United States Patent
Okumura et al.

(10) Patent No.: US 11,321,377 B2
(45) Date of Patent: May 3, 2022

(54) STORAGE CONTROL PROGRAM, APPARATUS, AND METHOD

(71) Applicant: FUJITSU LIMITED, Kawasaki (JP)

(72) Inventors: Hitoshi Okumura, Yokohama (JP); Takahide Muramoto, Zama (JP); Masaru Uchida, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 161 days.

(21) Appl. No.: 16/028,624

(22) Filed: Jul. 6, 2018

(65) Prior Publication Data

US 2019/0026289 A1    Jan. 24, 2019

(30) Foreign Application Priority Data

Jul. 21, 2017    (JP) .............................. JP2017-142083

(51) Int. Cl.
  *G06F 16/20*    (2019.01)
  *G06F 16/35*    (2019.01)
  (Continued)

(52) U.S. Cl.
  CPC ............ *G06F 16/355* (2019.01); *G06F 16/13* (2019.01); *G06F 16/285* (2019.01); *G06F 40/131* (2020.01); *G06Q 10/10* (2013.01)

(58) Field of Classification Search
  None
  See application file for complete search history.

(56) References Cited

U.S. PATENT DOCUMENTS 5,926,812 A * 7/1999 Hilsenrath ............ G06F 16/355
                                                      707/737
2004/0019879 A1    1/2004 Segawa et al.
(Continued)

FOREIGN PATENT DOCUMENTS

JP    2002-342142 A    11/2002
JP    2005-250820 A     9/2005
(Continued)

OTHER PUBLICATIONS

Extended European Search Report dated Nov. 19, 2018 for corresponding European Patent Application No. 18181890.7, 9 pages. Please note US-2011/0231750-A1 cited herewith, was previously cited in a IDS filed on Jul. 6, 2018.
(Continued)

*Primary Examiner* — Jau Shya Meng
(74) *Attorney, Agent, or Firm* — Fujitsu Patent Center

(57) ABSTRACT

A storage control method comprising steps of; accepting a file that includes a plurality of pieces of text data and a piece of information indicating a correspondence between each of the plurality of pieces of text data and attributes of the piece of text data; classifying the plurality of pieces of text data into a plurality of groups in accordance with the plurality of attributes that are each associated with any one of the plurality of pieces of text data, based on the piece of information indicating the correspondence included in the accepted file; generating, for each of the plurality of groups, a file that stores one or a plurality of pieces of text data included in the group; and storing the generated file in a storage destination corresponding to the attributes of the one or plurality of pieces of text data included in the file.

6 Claims, 21 Drawing Sheets

(51) Int. Cl.
*G06Q 10/10* (2012.01)
*G06F 16/28* (2019.01)
*G06F 40/131* (2020.01)
*G06F 16/13* (2019.01)

(56) References Cited

U.S. PATENT DOCUMENTS

| | | |
|---|---|---|
| 2005/0198060 A1 | 9/2005 | Imaki et al. |
| 2006/0218127 A1* | 9/2006 | Tate ............... G06F 9/5055 |
| 2007/0282787 A1 | 12/2007 | Shirai et al. |
| 2009/0248671 A1* | 10/2009 | Maruyama ......... G06F 16/353 |
| 2010/0332456 A1* | 12/2010 | Prahlad ............ G06F 16/122 |
| | | 707/664 |
| 2011/0231750 A1 | 9/2011 | Naito |
| 2013/0151491 A1* | 6/2013 | Gislason .......... G06F 16/2282 |
| | | 707/696 |
| 2018/0113936 A1* | 4/2018 | Balachandran ...... G06F 16/221 |

FOREIGN PATENT DOCUMENTS

| | | |
|---|---|---|
| JP | 2011-197898 | 10/2011 |
| JP | 2016-145861 | 8/2016 |
| WO | 03/107174 A1 | 12/2003 |

OTHER PUBLICATIONS

Japanese Office Action dated Apr. 6, 2021 for corresponding Japanese Patent Application No. 2017-142083, with English Translation, 12 pages.

European Office Action dated May 7, 2021 for corresponding European Patent Application No. 18181890.7, 8 pages *Please note US-2005/0198060-A1 cited herewith, was previously cited In an IDS filed on Nov. 29, 2018.*

European Oral Proceedings dated Jan. 28, 2022 for corresponding European Patent Application No. 18181890.7, 6 pages. *Please note US-2005/0198060-A1 cited herewith, was previously cited in an IDS filed on Nov. 29, 2018.*

* cited by examiner

FIG. 9

```
<link:linkbase…>
<gen:link xlink:type="extended" xlink:role="http://link1">
```
(0)

```
<va:valueAssertion … id="rule1" xlink:label="rule1" test="$a >=0" />
```
(1)

```
<variable:factVariable … id="v1" xlink:label="v1" />
```
(2)

```
<variable:variableArc … xlink:arcrole="http://xbrl.org/arcrole/2008/variable-set"
xlink:from="rule1" xlink:to="v1" name="v1" />
```
(a)

```
<cf:conceptName xlink:label="f1" id="f1"> …. </cf:conceptName>
```
(3)

```
<variable:variableFilterArc xlink:arcrole="http://xbrl.org/arcrole/2008/variable-filter"
xlink:from="v1" xlink:to="f1" … />
```
(b)

```
<msg:message … xlink:label="m1" xlink:role="http://www.xbrl.org/2010/role/message"
xml:lang="en" id="m1">message</msg:message>
```
(4)

```
<gen:arc … xlink:arcrole="http://xbrl.org/arcrole/2010/assertion-unsatisfied-message"
xlink:from="rule1" xlink:to="m1b" />
```
(c)

```
<label:label … xlink:label="l1" xml:lang="en" xlink:role="http://www.xbrl.org/2008/role/label"
id="label_aeb">label</label:label>
```
(5)

```
<gen:arc … xlink:arcrole="http://xbrl.org/arcrole/2008/element-label" xlink:from="rule1"
xlink:to="l1" />
```
(d)

```
</gen:link>
<link:linkbase…
```

FIG. 10

| PIECE NUMBER | LINK TYPE | ELEMENT NAME | ID | LANGUAGE | RESOURCE ROLE | EXTENDED LINK ROLE |
|---|---|---|---|---|---|---|
| 1 | generic | va:valueAssertion | rule1 | — | — | http://link1 |
| 2 | generic | variable:factVariable | v1 | — | — | http://link1 |
| 3 | generic | cf:conceptName | f1 | — | — | http://link1 |
| 4 | generic | msg:message | m1 | en | http://www.xbrl.org/2010/role/message | http://link1 |
| 5 | generic | label:label | l1 | en | http://www.xbrl.org/2008/role/label | http://link1 |
| ... | ... | ... | ... | ... | ... | ... |

FIG. 11

| PIECE NUMBER | LINK TYPE | ELEMENT NAME | PARENT ELEMENT NAME | CHILD ELEMENT NAME | ARC ROLE | EXTENDED LINK ROLE |
|---|---|---|---|---|---|---|
| 1 | generic | variable:variableArc | va:valueAssertion | variable:factVariable | http://xbrl.org/arcrole/2008/variable-set | http://link1 |
| 2 | generic | variable:variableFilterArc | variable:factVariable | cf:conceptName | http://xbrl.org/arcrole/2008/variable-filter | http://link1 |
| 3 | generic | gen:arc | va:valueAssertion | msg:message | http://xbrl.org/arcrole/2010/assertion-unsatisfied-message | http://link1 |
| 4 | generic | gen:arc | va:valueAssertion | label:label | http://xbrl.org/arcrole/2008/element-label | http://link1 |
| ... | ... | ... | ... | ... | ... | ... |

FIG. 12

| PIECE NUMBER | RULE | | | | | | | STORAGE DESTINATION | |
|---|---|---|---|---|---|---|---|---|---|
| | LINK TYPE | ELEMENT NAME | ID | LANGUAGE | RESOURCE ROLE | EXTENDED LINK ROLE | | LINKBASE | SCHEMA LOCATION |
| 1 | generic | va:value Assertion | ANY | ANY | ANY | ANY | | ${schemaLocation}/${schemaFileName}-rule-${resourceID}.xml | val\schema1.xsd |
| 2 | generic | msg:message | ANY | ANY | ANY | ANY | | ${schemaLocation}/${schemaFileName}-rule-${parentResourceID}-msg-${lang}.xml | val\schema1.xsd |
| 3 | generic | label:label | ANY | ANY | ANY | ANY | | ${schemaLocation}/${schemaFileName}-rule-${parentResourceID}-lab-${lang}.xml | val\schema1.xsd |
| ⋮ | ⋮ | ⋮ | ⋮ | ⋮ | ⋮ | ⋮ | | ⋮ | ⋮ |

FIG. 13

| PIECE NUMBER | RULE | | | | | | STORAGE DESTINATION | |
|---|---|---|---|---|---|---|---|---|
| | LINK TYPE | ELEMENT NAME | PARENT ELEMENT NAME | CHILD ELEMENT NAME | ARC ROLE | EXTENDED LINK ROLE | LINKBASE | SCHEMA LOCATION |
| 1 | generic | variable:variableArc | ANY | ANY | ANY | ANY | STORAGE DESTINATION OF CHILD ELEMENT | — |
| ... | ... | ... | ... | ... | ... | ... | ... | ... |

FIG. 14

```
<link:linkbase…>
<gen:link xlink:type="extended" xlink:role="http://link1">

<va:valueAssertion … id="rule1" xlink:label="rule1" test="$a >=0" />   (1)

<variable:factVariable … id="v1" xlink:label="v1" />   (2)

<variable:variableArc … xlink:arcrole="http://xbrl.org/arcrole/2008/variable-set"
     xlink:from="rule1" xlink:to="v1" name="v1" />   (a)

<cf:conceptName xlink:label="f1" id="f1"> … </cf:conceptName>   (3)

<variable:variableFilterArc xlink:arcrole="http://xbrl.org/arcrole/2008/variable-filter"
     xlink:from="v1" xlink:to="f1" … />   (b)

</gen:link>
<link:linkbase…
```

FIG. 15

```
<link:linkbase…>
<gen:link xlink:type="extended" xlink:role="http://link1">

<msg:message … xlink:label="m1" xlink:role="http://www.xbrl.org/2010/role/message"
    xml:lang="en" id="m1">message</msg:message>                                              (4)

<link:loc … xlink:href="schema1-rule-va1.xml#rule1" xlink:label="rule1" />

<gen:arc … xlink:arcrole="http://xbrl.org/arcrole/2010/assertion-unsatisfied-message"
    xlink:from="rule1" xlink:to="m1b" />                                                     (c)

</gen:link>
<link:linkbase…
```

FIG. 16

```
<link:linkbase…>
<gen:link xlink:type="extended" xlink:role="http://link1">

<label:label … xlink:label="l1" xml:lang="en" xlink:role="http://www.xbrl.org/2008/role/label"
 id="label_aeb">label</label:label>                                                              (5)

<link:loc … xlink:href="schema1-rule-va1.xml#rule1"  xlink:label="rule1" />

<gen:arc … xlink:arcrole="http://xbrl.org/arcrole/2008/element-label"  xlink:from="rule1"         (d)
 xlink:to="l1" />

</gen:link>
<link:linkbase…
```

FIG. 20

| PIECE NUMBER | LINK TYPE | ELEMENT NAME | ID | LANGUAGE | RESOURCE ROLE | EXTENDED LINK ROLE |
|---|---|---|---|---|---|---|
| 1 | generic | va:valueAssertion | rule1 | — | — | http://link1 |
| 2 | generic | variable:factVariable | v1 | — | — | http://link1 |
| 3 | generic | cf:conceptName | f1 | — | — | http://link1 |
| 4 | generic | msg:message | m1 | en | http://www.xbrl.org/2010/role/message | http://link1 |
| 5 | generic | label:label | l1 | ja | http://www.xbrl.org/2008/role/label | http://link1 |
| ... | ... | ... | ... | ... | ... | ... |

FIG. 21

| PIECE NUMBER | LINK TYPE | ELEMENT NAME | ID | LANGUAGE | RESOURCE ROLE | EXTENDED LINK ROLE |
|---|---|---|---|---|---|---|
| 1 | generic | va:valueAssertion | rule2 | – | – | http://link1 |
| 2 | generic | variable:factVariable | v1 | – | – | http://link1 |
| 3 | generic | cf:conceptName | f1 | – | – | http://link1 |
| 4 | generic | msg:message | m1 | en | http://www.xbrl.org/2010/role/message | http://link1 |
| 5 | generic | label:label | l1 | en | http://www.xbrl.org/2008/role/label | http://link1 |
| ... | ... | ... | ... | ... | ... | ... |

STORAGE CONTROL PROGRAM, APPARATUS, AND METHOD

CROSS-REFERENCE TO RELATED APPLICATION

This application is based upon and claims the benefit of priority of the prior Japanese Patent Application No. 2017-142083, filed on Jul. 21, 2017, the entire contents of which are incorporated herein by reference.

FIELD

The embodiments discussed herein are related to a storage control program, a storage control apparatus, and a storage control method.

BACKGROUND

In recent years, extensible business reporting language (XBRL) that is a language based on the extensible markup language (XML) standard has been used to smoothly distribute pieces of financial information, such as a financial statement.

XBRL is composed of a concept called an instance and a concept called a taxonomy. An instance and a taxonomy are set for every piece of numerical information to be disclosed. More specifically, in XBRL, a piece of data, such as a sales figure or an operating profit, itself is set as an instance, and definition elements indicating a presentation structure, a presentation method, and the like are set as a taxonomy (see, for example, Japanese Laid-open Patent Publication Nos. 2011-197898 and 2016-145861).

In a taxonomy as described above, management may be performed by, for example, performing classification such that definition elements having the same attribute fall into the same group and storing definition elements in each group in a different file.

However, the number of types of definition elements included in the taxonomy is increasing yearly. For this reason, for example, if classification and the like of the definition elements included in the taxonomy are manually performed, the work burden may become immense.

Under the circumstances, in one aspect, the embodiments are intended to provide a storage control program, a storage control apparatus, and a storage control method capable of easily classifying definition elements included in a taxonomy.

SUMMARY

According to an aspect of the invention, a storage control method comprising steps of; accepting a file that includes a plurality of pieces of text data and a piece of information indicating a correspondence between each of the plurality of pieces of text data and attributes of the piece of text data; classifying the plurality of pieces of text data into a plurality of groups in accordance with the plurality of attributes that are each associated with any one of the plurality of pieces of text data, based on the piece of information indicating the correspondence included in the accepted file; generating, for each of the plurality of groups, a file that stores one or a plurality of pieces of text data included in the group; and storing the generated file in a storage destination corresponding to the attributes of the one or plurality of pieces of text data included in the file.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a view for explaining a specific example of pieces of data corresponding to the definition elements included in the linkbase;

FIG. 10 is a chart for explaining a specific example of property information;

FIG. 11 is a chart for explaining a specific example of property information;

FIG. 12 is a chart for explaining a specific example of a storage destination rule;

FIG. 13 is a chart for explaining a specific example of the storage destination rule;

FIG. 14 is a view for explaining the details of the storage control process according to the first embodiment;

FIG. 15 is a view for explaining the details of the storage control process according to the first embodiment;

FIG. 16 is a view for explaining the details of the storage control process according to the first embodiment;

FIG. 20 is a chart for explaining the storage control process according to the second embodiment; and FIG. 21 is a chart for explaining the storage control process according to the second embodiment.

DESCRIPTION OF EMBODIMENTS

Configuration of Information Processing System

Figure 1:
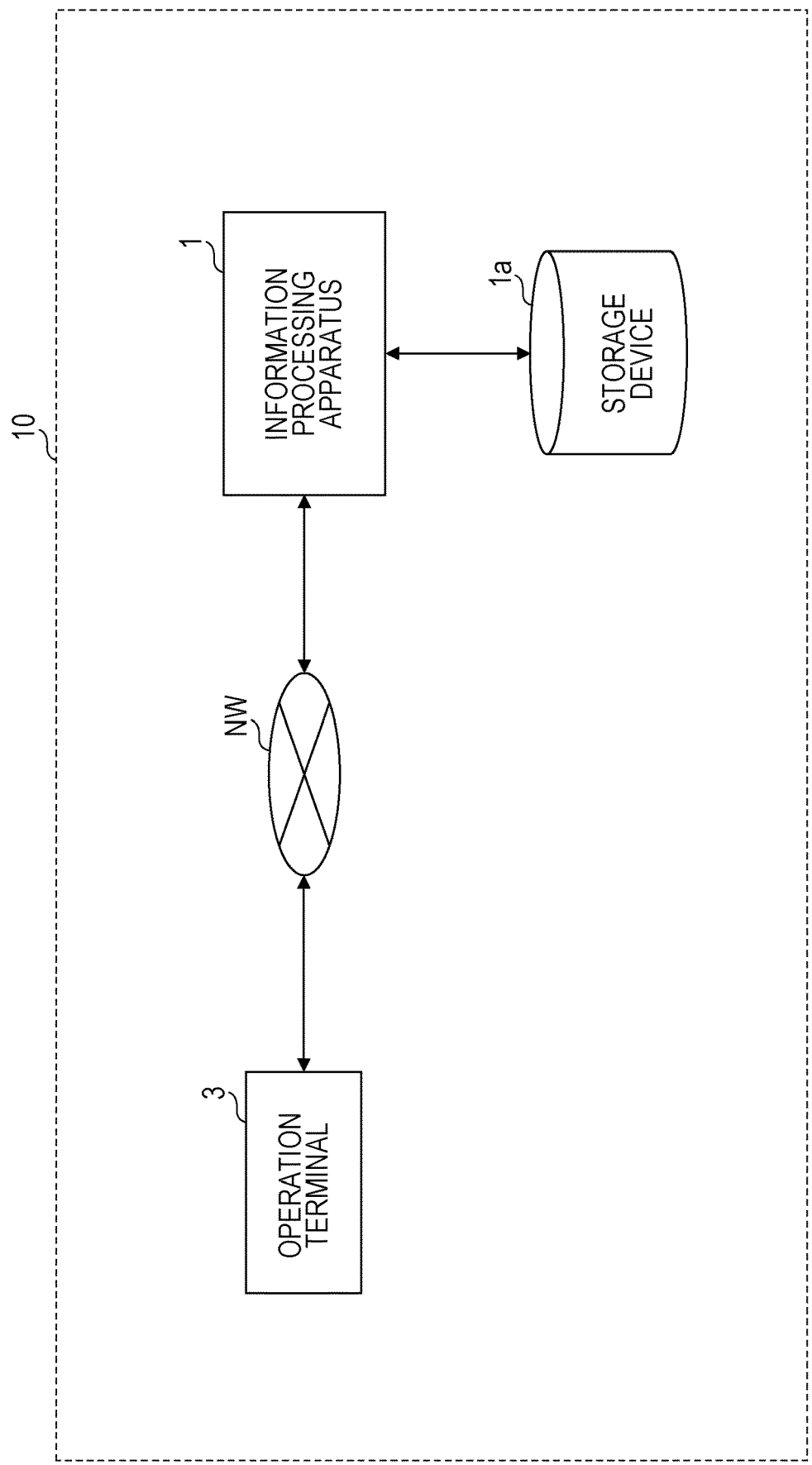
FIG. 1 is a diagram illustrating a configuration of an information processing system.

FIG. 1 is a diagram illustrating a configuration of an information processing system 10. The information processing system 10 illustrated in FIG. 1 includes, for example, an information processing apparatus 1 (hereinafter also referred to as the storage control apparatus 1), a storage device 1a, and an operation terminal 3. The operation terminal 3 illustrated in FIG. 1 is connected to the information processing apparatus 1 via a network NW, such as the Internet.

The operation terminal 3 is, for example, a terminal which is used by a person in charge of finance (hereinafter, also simply referred to as a person in charge) of a company. The person in charge, for example, generates a new taxonomy or updates a taxonomy already stored in the storage device 1a via the operation terminal 3. More specifically, the person in charge inputs a piece of information (a piece of financial information, for example) desired to generate a new taxonomy or update the taxonomy already stored in the storage device 1a to the information processing apparatus 1.

For example, if a desired piece of information is transmitted from the operation terminal 3, the information processing apparatus 1 generates a new taxonomy or updates the taxonomy already stored in the storage device 1a based on the transmitted piece of information. A specific example of a taxonomy will be described below.

Specific Example of Taxonomy

Figure 2:
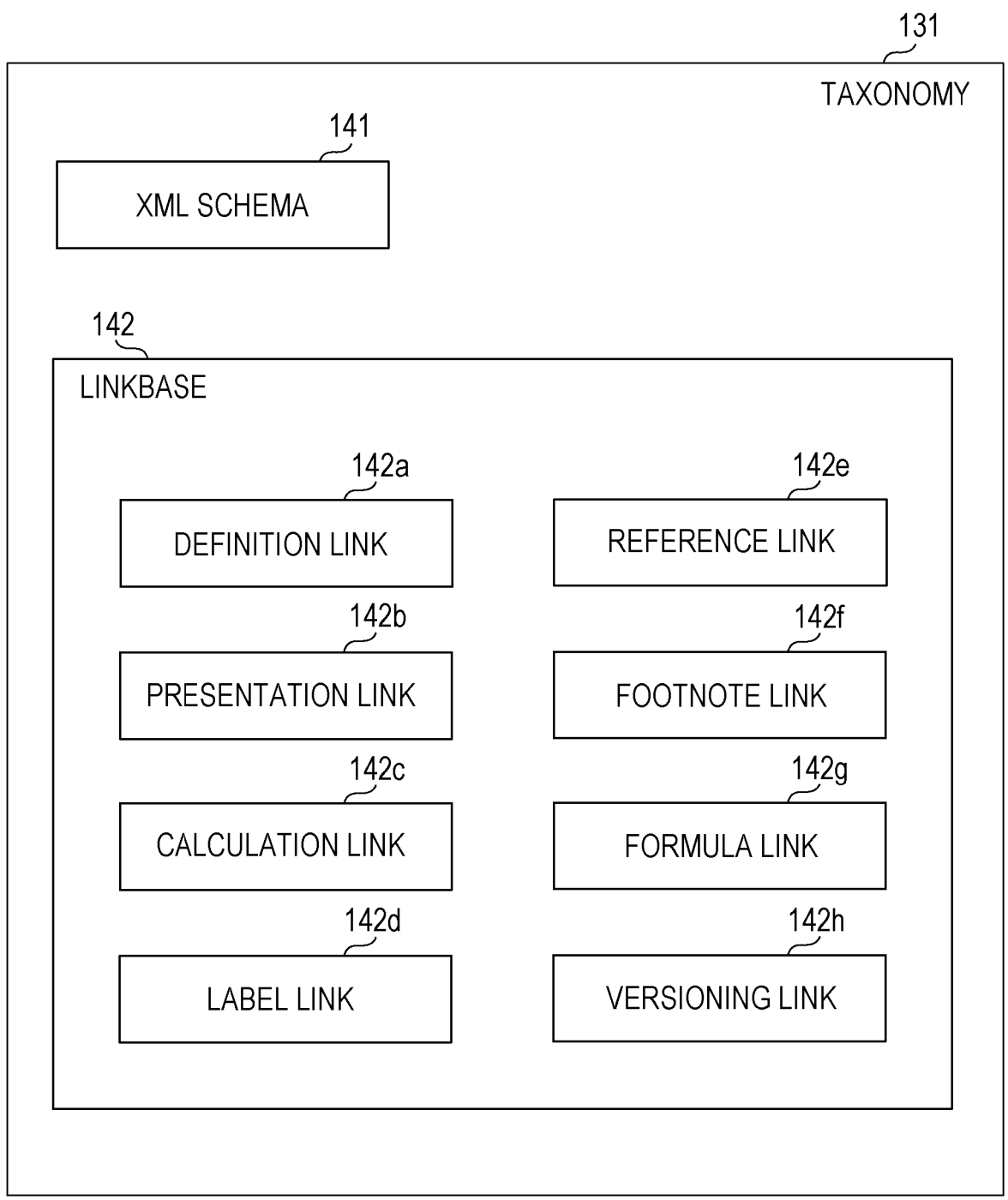
FIG. 2 is a diagram for explaining a specific example of a taxonomy.

FIG. 2 is a diagram for explaining the specific example of the taxonomy.

A taxonomy 131 illustrated in FIG. 2 includes an XML schema 141 and linkbases 142. The XML schema 141 defines names of items used in the taxonomy 131. Each linkbase 142 defines a relationship (link) between items used in the taxonomy 131.

More specifically, in the example illustrated in FIG. 2, the linkbases 142 include a definition link 142a which describes a logical relationship (a parent-child relationship, for example) between items, a presentation link 142b which describes presentation levels and a presentation order of the items, and a calculation link 142c which describes methods for totalization (addition and subtraction, for example) of the items and data checking. In the example illustrated in FIG. 2, the linkbases 142 also include a label link 142d which describes labels for displaying item names (a plurality of labels for languages, for example), a reference link 142e which describes authorities (provisions of a commercial law, for example) for the items, and a footnote link 142f which describes a footnote at the time of data entry and creation. In the example illustrated in FIG. 2, the linkbases 142 further include a formula link 142g which describes methods for totalization (four arithmetic operations, for example) of the items and advanced data checking, and a versioning link 142h which describes XBRL data and taxonomy version management.

In the taxonomy 131 (each linkbase 142 included in the taxonomy 131, for example) as described above, management may be performed by performing classification such that definition elements having the same attribute fall into the same group and storing definition elements in each group in a different file.

However, the number of types of definition elements included in the taxonomy 131 as described above is increasing yearly. For this reason, for example, if classification and the like of the definition elements included in the taxonomy 131 generated by the information processing apparatus 1 are manually performed, the work burden may become immerse.

Under the circumstances, the information processing apparatus 1 according to the present embodiment accepts a file which includes a plurality of definition elements (hereinafter also referred to as pieces of text data) included in the linkbase 142 and a piece of information (hereinafter also referred to as a piece of property information) indicating a correspondence between each of the plurality of definition elements and attributes of the definition element. More specifically, the information processing apparatus 1 acquires a file (files) storing definition elements of one or more linkbases 142 corresponding to details of designation among files of the taxonomy 131 stored in the storage device 1a in response to the designation (designation of the linkbase(s) 142 as a target for a storage control process) that is performed by the person in charge via the operation terminal 3.

The information processing apparatus 1 then classifies the plurality of definition elements into a plurality of groups in accordance with the plurality of attributes that are each associated with any one of the plurality of definition elements, based on the accepted pieces of information indicating the correspondences. After that, the information processing apparatus 1 generates, for each of the plurality of groups, a file which stores one or more definition elements included in the group and stores the generated file in a storage destination corresponding to attributes of the definition element(s) included in the file.

That is, the information processing apparatus 1 performs classification of each definition element included in the linkbase 142 by referring to the content of a piece of property information corresponding to the definition element.

The above-described configuration allows the information processing apparatus 1 to automatically classify each definition element included in the linkbase 142. The information processing apparatus 1 is thus capable of reducing the work burden of manual classification of definition elements.

Hardware Configuration of Information Processing Apparatus

Figure 3:
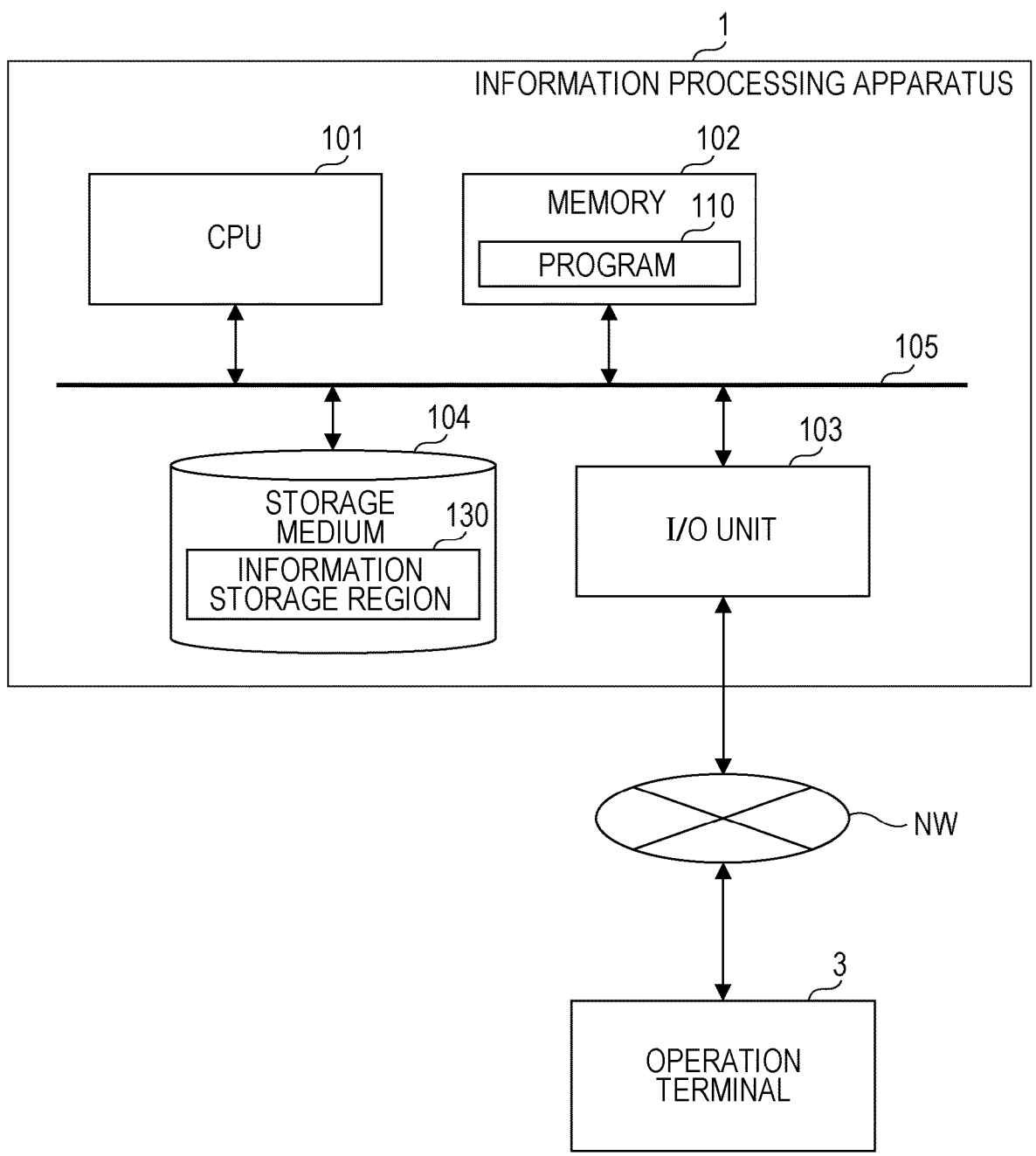
FIG. 3 is a diagram illustrating an example of a hardware configuration of an information processing apparatus.

A hardware configuration of the information processing apparatus 1 will be described. FIG. 3 is a diagram illustrating an example of the hardware configuration of the information processing apparatus 1.

The information processing apparatus 1 includes a CPU 101 as a processor, a memory 102, an external interface (I/O unit) 103, and a storage medium 104. The units are connected to one another via a bus 105.

The storage medium 104 stores a program 110 for performing a process (hereinafter also referred to as a storage control process) of classifying each definition element included in the linkbase 142 in, for example, a program storage region (not illustrated) inside the storage medium 104. The storage medium 104 also includes, for example, an information storage region 130 (hereinafter also referred to as the storage unit 130) which stores information used to perform the storage control process. Note that the information storage region 130 corresponds to the storage device 1a described with reference to FIG. 1.

As illustrated in FIG. 3, the CPU 101 loads the program 110 from the storage medium 104 onto the memory 102 at the time of execution of the program 110 and performs the storage control process in cooperation with the program 110.

The external interface 103 communicates with the operation terminal 3 via, for example, the network NW.

Function of Information Processing Apparatus

Figure 4:
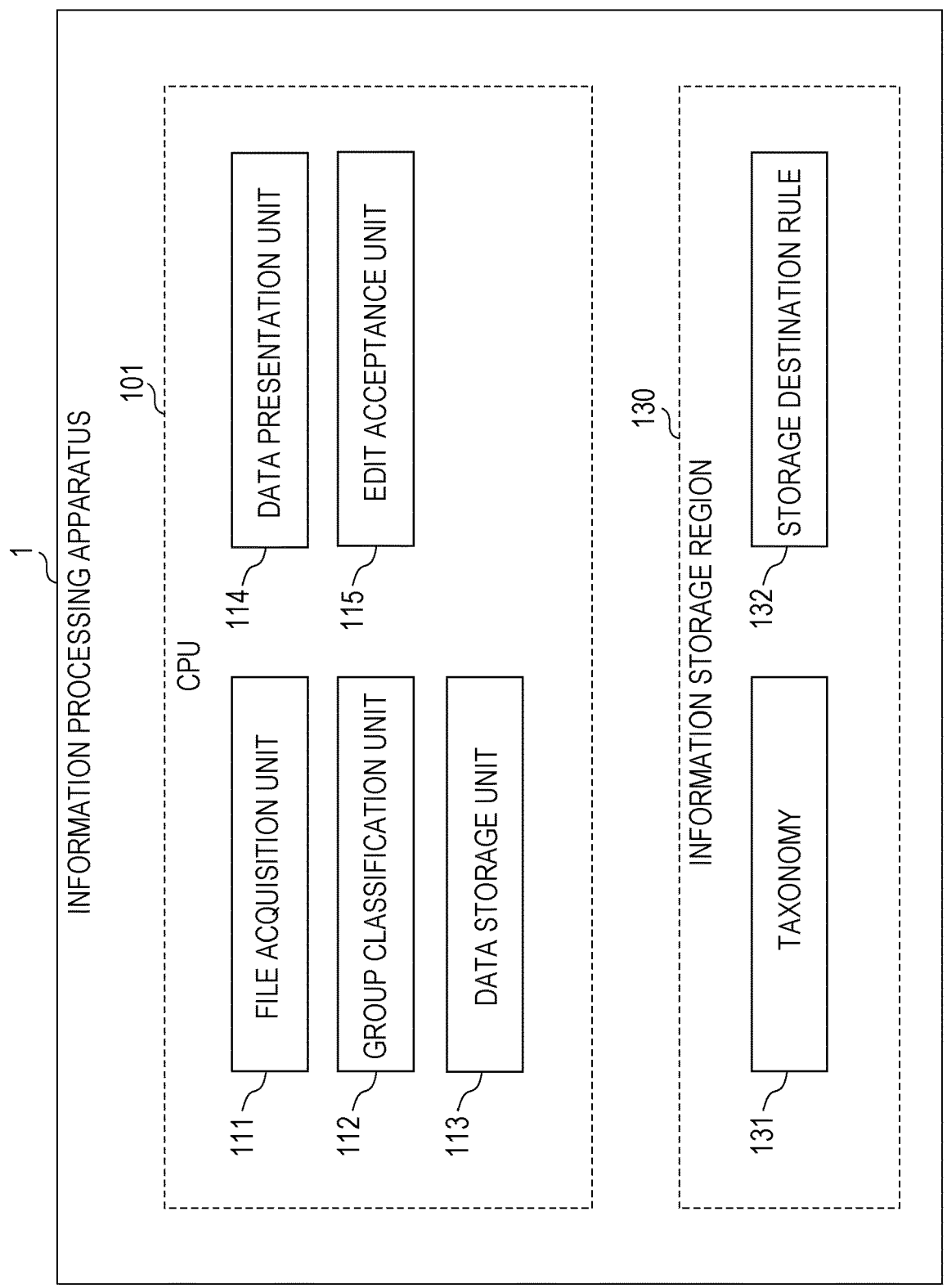
FIG. 4 is a functional block diagram of the information processing apparatus.

Functions of the information processing apparatus 1 will be described. FIG. 4 is a functional block diagram of the information processing apparatus 1.

The CPU 101 of the information processing apparatus 1 operates as, for example, a file acquisition unit 111 (hereinafter also referred to as the file acceptance unit 111), a group classification unit 112, a data storage unit 113, a data presentation unit 114, and an edit acceptance unit 115 by working in cooperation with the program 110. The taxonomy 131 and a storage destination rule 132 are stored in the information storage region 130. Note that the data storage unit 113 is assumed to include a file generation unit 113a and a file storage unit 113b in the following description.

The file acquisition unit 111 acquires a file which includes a plurality of definition elements included in the linkbase 142 and a piece of information (a piece of property information) indicating a correspondence between each of the plurality of definition elements and attributes of the definition element.

More specifically, the information processing apparatus 1 acquires a file (files) storing definition elements of one or more linkbases 142 corresponding to details of designation among files of the taxonomy 131 stored in the storage device 1a in response to the designation (designation of the linkbase(s) 142 to be subjected to the storage control process) that is performed by the person in charge via the operation terminal 3.

The group classification unit 112 classifies the plurality of definition elements included in the file(s) acquired by the file acquisition unit 111 into a plurality of groups in accordance with a plurality of attributes which are each associated with any one of the plurality of definition elements, based on pieces of information indicating correspondences included in the file(s) acquired by the file acquisition unit 111.

More specifically, the group classification unit 112 classifies the plurality of definition elements in accordance with the content of the storage destination rule 132 stored in the information storage region 130. The storage destination rule 132 may be, for example, generated in advance by the person in charge of the company and stored in the information storage region 130.

The file generation unit 113a generates, for each of the plurality of groups, a classification into which is made by the group classification unit 112, a file which stores one or more definition elements in the group.

More specifically, the file generation unit 113a generates a file which stores one or more definition elements included in each group in accordance with the content of the storage destination rule 132 stored in the information storage region 130.

The file storage unit 113b stores each file generated by the file generation unit 113a in a storage destination corresponding to attributes of a definition element (definition elements) included in the file.

The data presentation unit 114 associates each of the plurality of definition elements included in each file acquired by the file acquisition unit 111 with attributes of the definition element, based on the pieces of information indicating the correspondences included in the file acquired by the file acquisition unit 111, and presents the plurality of definition elements on a display unit (a display device of the operation terminal 3, for example).

The edit acceptance unit 115 accepts an edit which changes a correspondence between any one of the plurality of definition elements presented by the data presentation unit 114 and attributes of the definition element. In this case, the group classification unit 112 classifies the plurality of definition elements presented by the data presentation unit 114 into a plurality of groups in accordance with the plurality of attributes that are each associated with any one of the plurality of definition elements, based on the pieces of information indicating the correspondences after the edit accepted by the edit acceptance unit 115.

Overview of First Embodiment

Figure 5:
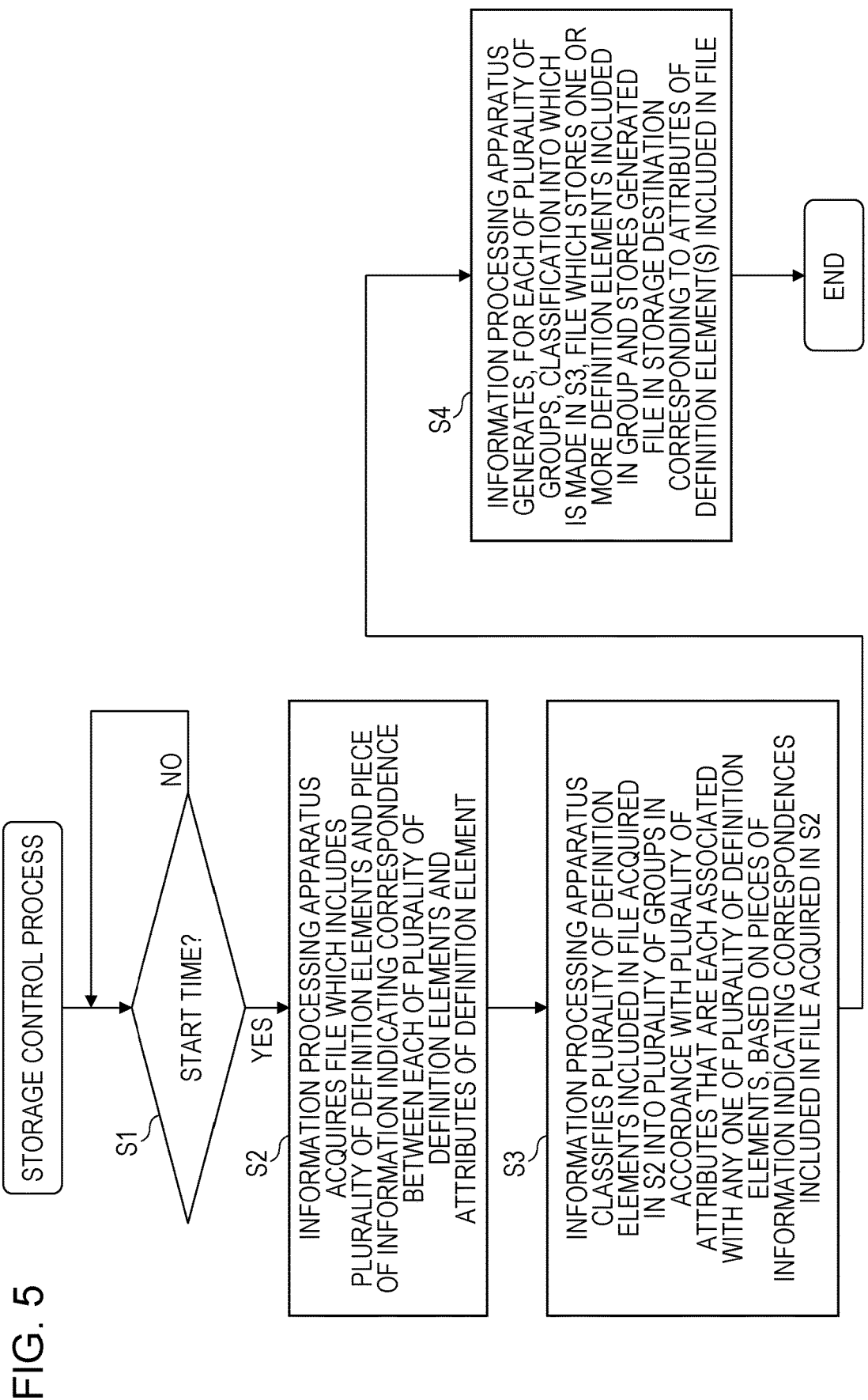
FIG. 5 is a flowchart for explaining an overview of a storage control process according to a first embodiment.

An overview of a first embodiment will be described. FIG. 5 is a flowchart for explaining an overview of a storage control process according to the first embodiment.

As illustrated in FIG. 5, an information processing apparatus 1 waits for a start time for the storage control process (NO in S1). A start time for the storage control process may be, for example, a time when a person in charge gives an instruction to start the storage control process via an operation terminal 3.

When a start time comes (YES in S1), the information processing apparatus 1 acquires a file which includes a plurality of definition elements included in a linkbase 142 and a piece of information indicating a correspondence between each of the plurality of definition elements and attributes of the definition element (S2).

The information processing apparatus 1 then classifies the plurality of definition elements included in the file acquired in the process in S2 into a plurality of groups in accordance with the plurality of attributes that are each associated with any one of the plurality of definition elements, based on the pieces of information indicating the correspondences included in the file acquired in the process in S2 (S3).

After that, the information processing apparatus 1 generates, for each of the plurality of groups, a classification into which is made in the process in S3, a file which stores one or more definition elements included in the group and stores the generated file in a storage destination corresponding to attributes of the definition element(s) included in the file (S4).

That is, the information processing apparatus 1 classifies each definition element included in the linkbase 142 by referring to the content of a piece of property information corresponding to the definition element.

The above-described configuration allows the information processing apparatus 1 to automatically classify each definition element included in the linkbase 142. The information processing apparatus 1 is thus capable of reducing the work burden of manual classification of definition elements.

Details of First Embodiment

Figure 6:
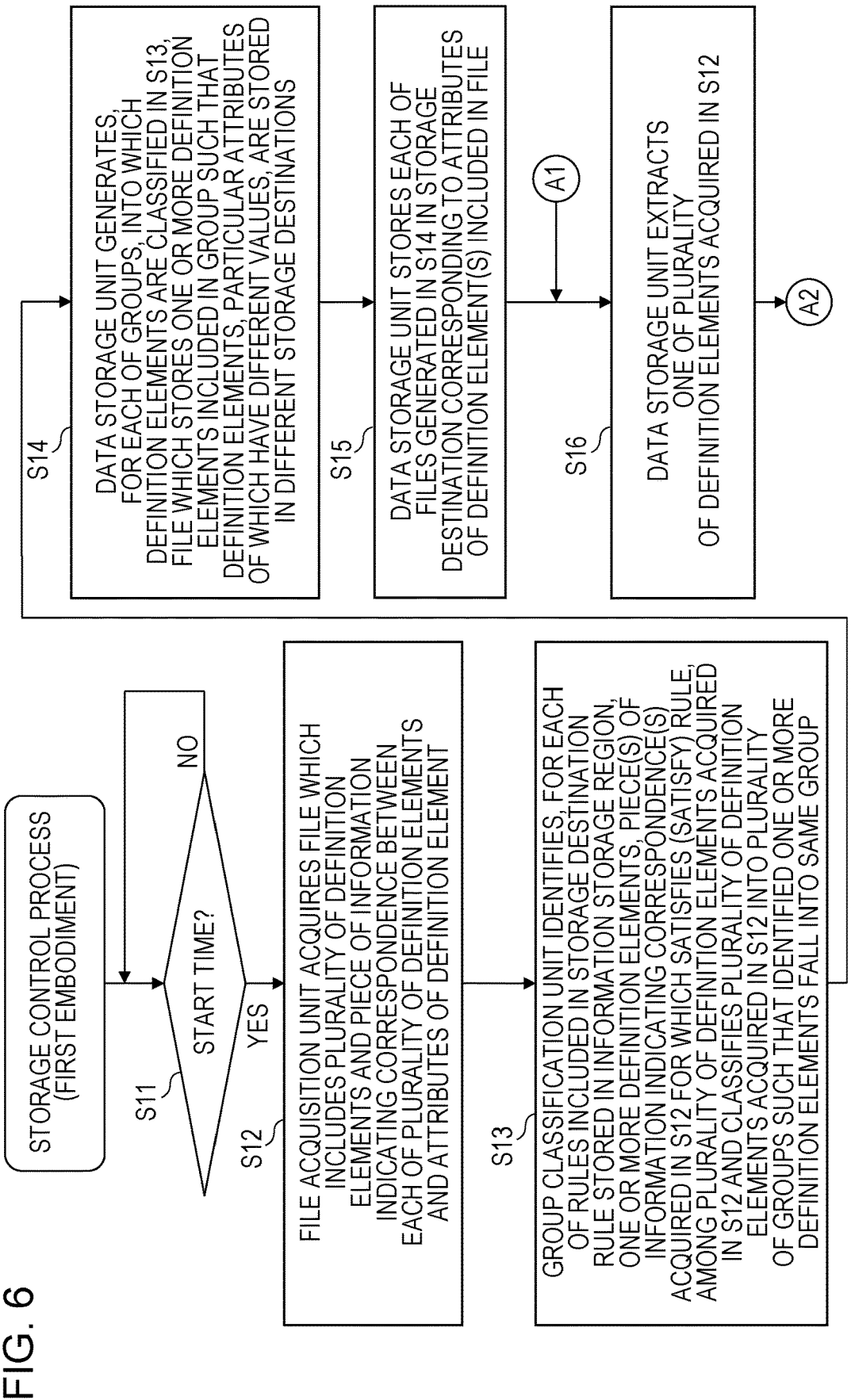
FIG. 6 is a flowchart for explaining details of the storage control process according to the first embodiment.
Figure 7:
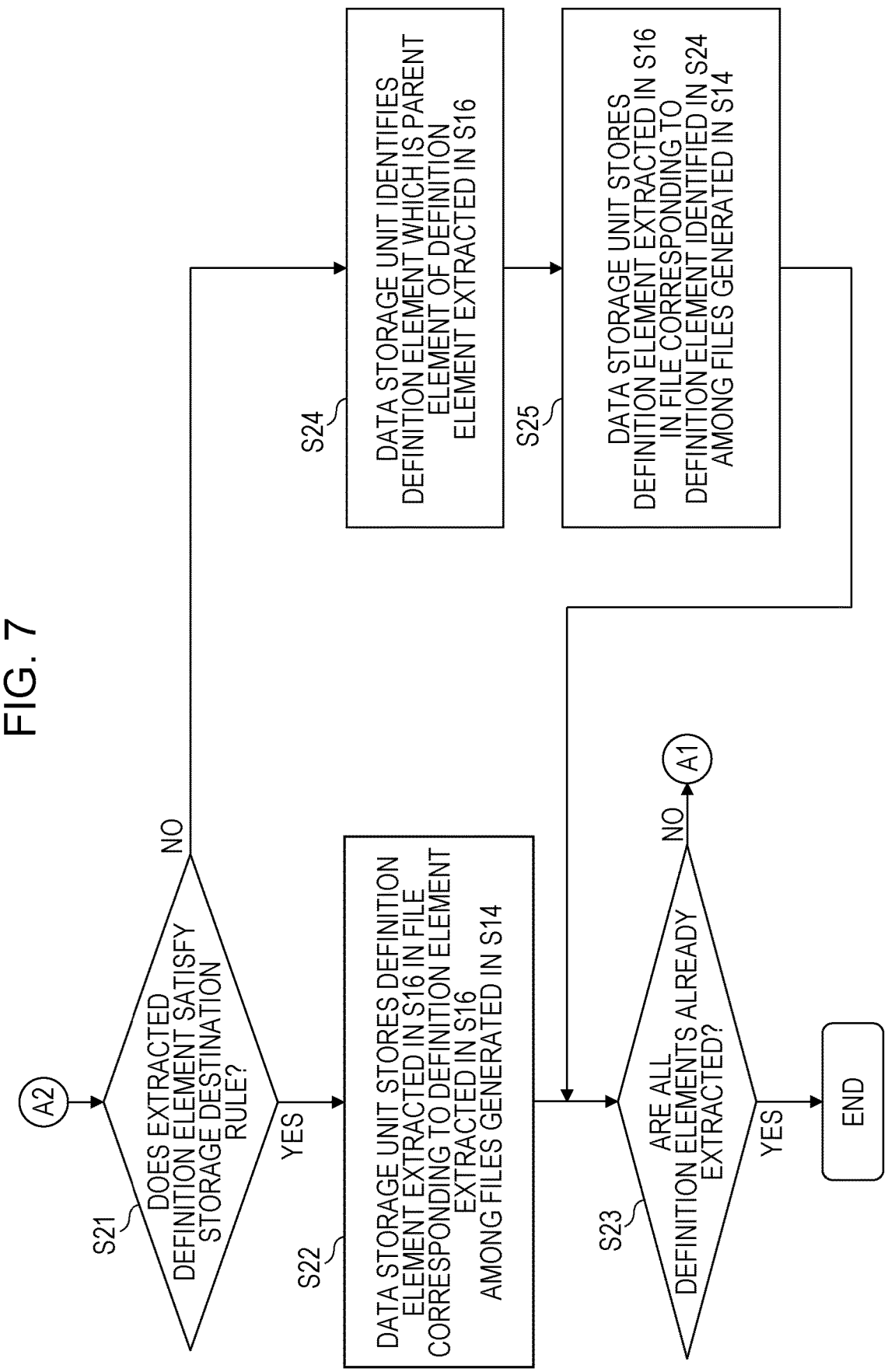
FIG. 7 is a flowchart for explaining the details of the storage control process according to the first embodiment.

Details of the first embodiment will be described. FIGS. 6 and 7 are flowcharts for explaining details of the storage control process according to the first embodiment. FIGS. 8 to 16 are charts for explaining the details of the storage control process according to the first embodiment. The details of the storage control process in FIGS. 6 and 7 will be described with reference to FIGS. 8 to 16.

Specific Example of Data Model for Definition Element Included in Linkbase

Figure 8:
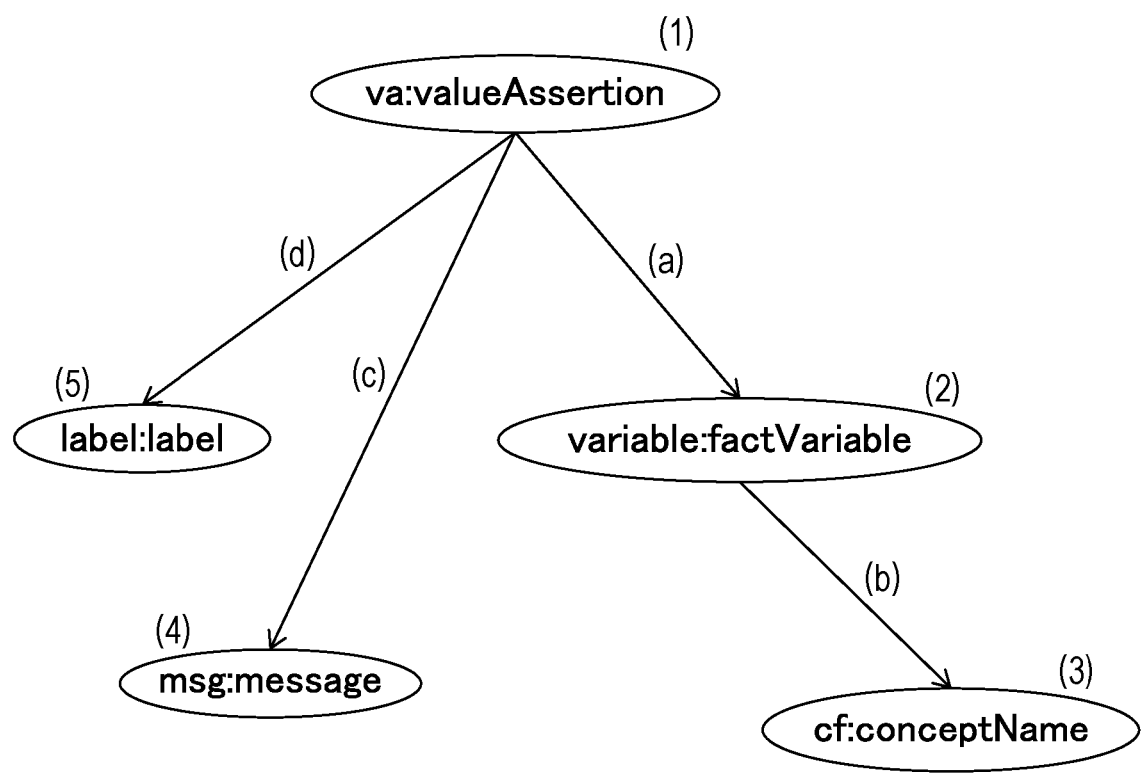
FIG. 8 is a diagram for explaining a specific example of a data model for definition elements included in a linkbase.

A specific example (an image) of a data model for definition elements included in the linkbase 142 will be described first. FIG. 8 is a diagram for explaining the specific example of the data model for the definition elements included in the linkbase 142. Note that a description will be given below on the assumption that the definition elements include resources which are included in the linkbase 142 and a relation which defines a correspondence between resources. A description will be given below, taking as an example definition elements included in a formula link 142g described with reference to FIG. 2.

In the example illustrated in FIG. 8, the definition elements included in the formula link 142g include va:valueAssertion (hereinafter, also simply referred to as resource (1)), variable:factVariable (hereinafter, also simply referred to as resource (2)), cf:conceptName (hereinafter, also simply referred to as resource (3)), msg:message (hereinafter, also simply referred to as resource (4)), and label:label (hereinafter, also simply referred to as resource (5)) as resources.

In the example illustrated in FIG. 8, the definition elements included in the formula link 142g also include relation (a) that is a definition of a correspondence between resource (1) and resource (2), relation (b) that is a definition of a correspondence between resource (2) and resource (3), relation (c) that is a definition of a correspondence between resource (1) and resource (4), and relation (d) that is a definition of a correspondence between resource (1) and resource (5) as relations.

Specific Example of Data Corresponding to Definition Element Included in Linkbase A specific example of pieces of data corresponding to the definition elements included in the linkbase 142 will be described. FIG. 9 is a view for explaining the specific example of the pieces of data corresponding to the definition elements included in the linkbase 142. More specifically, FIG. 9 is a view for explaining a specific example of a case where the pieces of data corresponding to the definition elements included in the linkbase 142 are stored in one file.

In the example illustrated in FIG. 9, pieces of data surrounded by broken lines (1), (2), (3), (4), and (5) among the pieces of data corresponding to the definition elements included in the formula link 142g are pieces of data corresponding to resources (1), (2), (3), (4), and (5), respectively, described with reference to FIG. 8.

In the example illustrated in FIG. 9, pieces of data surrounded by broken lines (a), (b), (c), and (d) among the pieces of data corresponding to the definition elements included in the formula link 142g are pieces of data corresponding to relations (a), (b), (c), and (d), respectively, described with reference to FIG. 8.

In the example illustrated in FIG. 9, a piece of data surrounded by broken line (0) among the pieces of data corresponding to the definition elements included in the formula link 142g is a piece of data corresponding to resources (1) to (5) and relations (a) to (d) in common.

Note that the pieces of data surrounded by broken lines (1), (2), (3), (4), and (5) in the example in FIG. 9 will also hereinafter be referred to as data (1), data (2), data (3), data (4), and data (5), respectively. The pieces of data surrounded by broken lines (a), (b), (c), and (d) in the example in FIG. 9 will also hereinafter be referred to as data (a), data (b), data (c), and data (d), respectively. The piece of data surrounded by broken line (0) in the example in FIG. 9 will also hereinafter be referred to as data (0).

Specific Example of Property Information

Specific examples of property information 151 and property information 152 will be described. FIG. 10 is a chart for explaining a specific example of the property information 151. FIG. 11 is a chart for explaining a specific example of the property information 152.

The property information 151 is a piece of information which is generated by extracting parts of pieces of data on the resources among the pieces of data corresponding to the definition elements described with reference to FIG. 9. The property information 152 is a piece of information which is generated by extracting parts of pieces of data on the relations among the pieces of data corresponding to the definition elements described with reference to FIG. 9.

The property information 151 illustrated in FIG. 10 has, as items, a piece number for identification of each resource, information on which is included in the property information 151, a link type, as which the type of the linkbase 142 including the resource is set, an element name, as which an element name of the resource is set, and an ID, as which an attribute of the resource is set. The property information 151 illustrated in FIG. 10 also has, as items, a language, as which a language corresponding to the resource is set, a resource role, as which an address of a piece of information indicating a role of the resource, and an extended link role, as which an address of a piece of information indicating a role of an extended link corresponding to the resource is set.

More specifically, data (0) in the pieces of data described with reference to FIG. 9 includes a piece of data composed of the string gen:link and a piece of data composed of the string xlink:role="http://link1". For this reason, for example, generic and http://link1 are set as a link type and an extended link role, respectively, for each of pieces of information with piece numbers of 1 to 5 in the property information 151 illustrated in FIG. 10.

For example, data (1) in the pieces of data described with reference to FIG. 9 includes a piece of data composed of the string va:valueAssertion and a piece of data composed of the string id="rule1". For this reason, for example, va:valueAssertion and rule1 are set as an element name and an ID, respectively, for the piece of information with the piece number of 1 in the property information 151 illustrated in FIG. 10. Note that "-" indicating that there is no piece of information is set as each of a language and a resource role for the piece of information with the piece number of 1 in the property information 151 illustrated in FIG. 10.

For example, data (4) in the pieces of data described with reference to FIG. 9 includes a piece of data composed of the string msg:message, a piece of data composed of the string label="m1", a piece of data composed of the string lang="en", and a piece of data composed of the string role="http://www.xbrl.org/2010/role/message". For this reason, for example, msg:message, m1, en, and http://www.xbrl.org/2010/role/message are set as an element name, an ID, a language, and a resource role, respectively, for the piece of information with the piece number of 4 in the property information 151 illustrated in FIG. 10. A description of other pieces of information included in FIG. 10 will be omitted.

The property information 152 illustrated in FIG. 11 has, as items, a piece number for identification of each relation, information on which is included in the property information 152, a link type, as which the type of the linkbase 142 including the relation is set, and an element name, as which an element name of the relation is set. The property information 152 illustrated in FIG. 11 also has, as items, a parent element name, as which a name of a parent element resource of resources corresponding to the relation is set, a child element name, as which a name of a child element resource of the resources corresponding to the relation is set, an arc role, as which an address of a piece of information indicating a role of the relation, and an extended link role, as which an address of a piece of information indicating a role of an extended link corresponding to the relation is set.

More specifically, data (0) in the pieces of data described with reference to FIG. 9 includes the piece of data composed of the string gen:link and the piece of data composed of the string xlink:role="http://link1". For this reason, for example, generic and http://link1 are set as a link type and an extended link role, respectively, for each of pieces of information with piece numbers of 1 to 4 in the property information 152 illustrated in FIG. 11.

For example, data (a) in the pieces of data described with reference to FIG. 9 includes a piece of data composed of the string variable:variableArc, a piece of data composed of the string from="rule1", a piece of data composed of the string to="v1", and a piece of data composed of the string arcrole="http://xbrl.org/arcrole/2008/variable-set". For this reason, for example, variable:variableArc, va:valueAssertion, variable:factVariable, and http://xbrl.org/arcrole/2008/variable-set are set as an element name, a parent element name, a child element name, and an arc role, respectively, for the piece of information with the piece number of 1 in the property information 152 illustrated in FIG. 11. A description of other pieces of information included in FIG. 11 will be omitted.

Flowchart for Explaining Details of First Embodiment

Flowcharts for explaining the details of the first embodiment will be described. FIGS. 6 and 7 are flowcharts for explaining the details of the first embodiment.

As illustrated in FIG. 6, the file acquisition unit 111 of the information processing apparatus 1 waits for a start time for the storage control process (NO in S11).

When a start time comes (YES in S11), the file acquisition unit 111 acquires a file which includes a plurality of definition elements included in the linkbase 142 and a piece of information (a piece of property information) indicating a correspondence between each of the plurality of definition elements and attributes of the definition element (S12).

A group classification unit 112 of the information processing apparatus 1 refers to the pieces of information (the pieces of property information) indicating the correspondences acquired in the process in S12 and identifies, for each of rules included in a storage destination rule 132 stored in an information storage region 130, one or more definition elements, the piece(s) of information indicating the correspondence(s) acquired in the process in S12 for which satisfies (satisfy) the rule, among the plurality of definition elements acquired in the process in S12. The group classification unit 112 further classifies the plurality of definition elements acquired in the process in S12 into a plurality of groups such that the identified one or more definition elements fall into the same group (S13). A specific example of the storage destination rule 132 will be described below.

Specific Example of Storage Destination Rule

FIGS. 12 and 13 are charts for explaining specific examples of the storage destination rule 132. More specifically, FIG. 12 is a chart for explaining a specific example of a storage destination rule 132*a* for resources. FIG. 13 is a chart for explaining a specific example of a storage destination rule 132*b* for relations.

The storage destination rule 132*a* will be described first. The storage destination rule 132*a* illustrated in FIG. 12 has, as items, a piece number for identification of each piece of information included in the storage destination rule 132*a*, a rule, as which rules for determining a storage destination of a resource concerned are set, and a storage destination, as which a storage destination where a resource which satisfies the rule set as the rule is stored is set. The rule that is an item in the storage destination rule 132*a* illustrated in FIG. 12 has, as subitems, a link type, an element name, an ID, a language, a resource role, and an extended link role, like the property information 151 described with reference to FIG. 10. The storage destination that is an item in the storage destination rule 132*a* illustrated in FIG. 12 has, as subitems, a linkbase, as which a filename of the linkbase 142 as a storage destination is set, and a schema location, as which a storage location and a filename of an XML schema 141 (a file) that refers to the linkbase 142 (a file) set as the linkbase are set.

More specifically, in the storage destination rule 132*a* illustrated in FIG. 12, generic and va:valueAssertion are set as a link type and an element name, respectively, for a piece of information with a piece number of 1. In the storage destination rule 132*a* illustrated in FIG. 12, ANY indicating any type of information is set as each of an ID, a language, a resource role, and an extended link role for the piece of information with the piece number of 1. In the storage destination rule 132*a* illustrated in FIG. 12, ${schemaLocation}/${schemaFileName}-rule-${resourceID}.xml and val\schema1.xsd are set as a linkbase and a schema location, respectively, for the piece of information with the piece number of 1. A description of other pieces of information included in FIG. 12 will be omitted.

Note that, in the example illustrated in FIG. 12, ${schemaLocation} is a variable, in which the storage location of the XML schema 141 (a file) that refers to the linkbase 142 including a resource concerned is set, and that ${schemaFileName} is a variable, in which a filename without an extension of the XML schema 141 that refers to the linkbase 142 (a file) including the resource is set. In the example illustrated in FIG. 12, ${resourceID} is a variable, in which a piece of information set as an ID of the resource is set, and ${parentResourceID} is a variable, in which a piece of information set as an ID of a parent element resource of the resource is set. In the example illustrated in FIG. 12, ${lang} is a variable, in which a piece of information set as a language of the resource is set.

The storage destination rule 132*b* will be described. The storage destination rule 132*b* illustrated in FIG. 13 has, as items, a piece number, a rule, and a storage destination, like the storage destination rule 132*a* described with reference to FIG. 12. The rule that is an item in the storage destination rule 132*b* illustrated in FIG. 13 has, as subitems, a link type, an element name, a parent element name, a child element name, an arc role, and an extended link role, like the property information 152 described with reference to FIG. 11. The storage destination that is an item in the storage destination rule 132*b* illustrated in FIG. 13 has, as subitems, a linkbase, as which a filename of the linkbase 142 as a storage destination of a resource whose name is set as a child element name is set, and a schema location, as which a storage location and a filename of the XML schema 141 (a file) that refers to the linkbase 142 (a file) set as the linkbase are set.

More specifically, in the storage destination rule 132*b* illustrated in FIG. 13, generic and variable:variableArc are set as a link type and an element name, respectively, for a piece of information with a piece number of 1. In the storage destination rule 132*b* illustrated in FIG. 13, ANY indicating any type of information is set as each of a parent element name, a child element name, an arc role, and an extended link role for the piece of information with the piece number of 1. In the storage destination rule 132*b* illustrated in FIG. 13, a storage destination of a child element and "-" are set as a linkbase and a schema location, respectively, for the piece of information with the piece number of 1.

The piece of information with the piece number of 1 in the property information 151 described with reference to FIG.

10 satisfies a rule for the piece number of 1 in the storage destination rule 132a illustrated in FIG. 12. The piece of information with the piece number of 4 in the property information 151 described with reference to FIG. 10 satisfies a rule for a piece number of 2 in the storage destination rule 132a illustrated in FIG. 12. The piece of information with the piece number of 5 in the property information 151 described with reference to FIG. 10 satisfies a rule for a piece number of 3 in the storage destination rule 132a illustrated in FIG. 12.

For this reason, the group classification unit 112 generates a group which includes data (1) alone corresponding to the piece of information with the piece number of 1 in the property information 151 described with reference to FIG. 10 in the process in S13. The group classification unit 112 also generates a group which includes data (4) alone corresponding to the piece of information with the piece number of 4 in the property information 151 described with reference to FIG. 10. The group classification unit 112 further generates a group which includes data (5) alone corresponding to the piece of information with the piece number of 5 in the property information 151 described with reference to FIG. 10.

The piece of information with the piece number of 1 in the property information 152 described with reference to FIG. 11 satisfies a rule for the piece number of 1 in the storage destination rule 132b illustrated in FIG. 13.

For this reason, the group classification unit 112 generates a group which includes data (a) alone corresponding to the piece of information with the piece number of 1 in the property information 152 described with reference to FIG. 11 in the process in S13. Note that a description will be given below on the assumption that a group which includes data (b) alone, a group which includes data (c) alone, and a group which includes data (d) alone are generated in the process in S13.

Referring back to FIG. 6, a data storage unit 113 (a file generation unit 113a) of the information processing apparatus 1 generates, for each of the groups, into which the definition elements are classified in the process in S13, a file which stores one or more definition elements included in the group such that definition elements, particular attributes of which have different values, are stored in different storage destinations (S14).

More specifically, of a piece of information set as the linkbase of the piece of information with the piece number of 1 in the storage destination rule 132a described with reference to FIG. 12, a portion corresponding to a filename (${schemaFileName}-rule-${resourceID}.xml) includes the variables ${schemaFileName} and ${resourceID}. For this reason, the file generation unit 113a, for example, generates a file for each of combinations of a filename of the XML schema 141 that refers to the linkbase 142 corresponding to the groups and pieces of information set as IDs in the property information 151 for resources included in the groups in the process in S14. That is, in this case, the file generation unit 113a generates a file using the filename of the XML schema 141 that refers to the linkbase 142 corresponding to each group and a piece of information set as an ID in the property information 151 for a resource included in the group as a particular attribute.

Note that a storage destination of a child element is set as a linkbase in the storage destination rule 132b described with reference to FIG. 13. That is, in this case, each relation is stored in the same file as a child element resource among resources corresponding to the relation. For this reason, the file generation unit 113a may generate a file solely for a group which includes a resource in the process in S14. A description will be given below on the assumption that a file is generated solely for a group which includes a resource.

The data storage unit 113 (a file storage unit 113b) stores each of the files generated in the process in S14 in a storage destination corresponding to attributes of a definition element (definition elements) included in the file (S15).

More specifically, the file storage unit 113b refers to a portion corresponding to a pathname (${schemaLocation}) of a piece of information set as a linkbase in the storage destination rule 132a described with reference to FIG. 12 and identifies a storage destination for each of the files generated in the process in S14. The file storage unit 113b stores the file generated in the process in S14 in the identified storage destination.

After that, the data storage unit 113 extracts one of the plurality of definition elements acquired in the process in S12 (S16). That is, the data storage unit 113 starts storing the plurality of definition elements acquired in the process in S12 in the files in response to the storage of the files in the storage destinations in the process in S15.

As illustrated in FIG. 7, the data storage unit 113 judges whether the definition element extracted in S16 is a definition element which satisfies any one of the rules included in the storage destination rule 132 (S21). That is, the data storage unit 113 judges whether the definition element extracted in the process in S16 is a definition element which is classified into any one of the groups in the process in S13.

If it is judged as a result that the definition element extracted in S16 is a definition element satisfying any one of the rules included in the storage destination rule 132 (YES in S21), the data storage unit 113 stores the definition element extracted in the process in S16 in a file corresponding to the definition element extracted in the process in S16 among the files generated in the process in S14 (S22).

More specifically, if a definition element corresponding to the piece of information with the piece number of 1 in the property information 151 described with reference to FIG. 10 is extracted in the process in S16, the data storage unit 113 identifies ${schemaLocation}/${schemaFileName}-rule-${resourceID}.xml that is a piece of information set as a linkbase for the piece of information with the piece number of 1 in the storage destination rule 132a described with reference to FIG. 12. In this case, val and schema1 that are pieces of information set in a schema location for the piece of information with the piece number of 1 in the storage destination rule 132a described with reference to FIG. 12 are substituted for ${schemaLocation} and ${schemaFileName}. In this case, rule1 that is a piece of information set as an ID for the piece of information with the piece number of 1 in the property information 151 described with reference to FIG. 10 is substituted for ${resourceID}.

For this reason, the data storage unit 113 stores the definition element (the definition element extracted in the process in S16) corresponding to the piece of information with the piece number of 1 in the property information 151 described with reference to FIG. 10 in, for example, to a file with a filename of val/schema1-rule-rule1.xml.

On the other hand, if it is judged that the definition element extracted in S16 is a definition element which satisfies none of the rules included in the storage destination rule 132 (NO in S21), the data storage unit 113 identifies a definition element which is a parent element of the definition element extracted in the process in S16 (S24).

More specifically, the data storage unit 113 refers to the property information 152 (property information on relations) described with reference to FIG. 11 and identifies the definition element that is the parent element of the definition element extracted in the process in S16 by identifying a piece of information which is set as a parent element name of a piece of information, a child element name of which is set to an element name of the definition element extracted in the process in S16. That is, if the definition element extracted in the process in S16 is a resource, the data storage unit 113 identifies a parent element resource of the extracted resource. If the definition element extracted in the process in S16 is a relation, the data storage unit 113 identifies a parent element resource among resources corresponding to the extracted relation.

Note that, if the parent element identified in the process in S24 satisfies none of the rules included in the storage destination rule 132, the data storage unit 113 may repeat identification of a parent element of a parent element identified in the process in S24 until the identified parent element satisfies any of the rules included in the storage destination rule 132.

The data storage unit 113 stores the definition element extracted in the process in S16 in a file corresponding to the definition element identified in the process in S24 among the files generated in the process in S14 (S25).

More specifically, a definition element corresponding to the piece of information with the piece number of 2 in the property information 151 described with reference to FIG. 10 satisfies none of the rules included in the storage destination rule 132. For this reason, if the definition element corresponding to the piece of information with the piece number of 2 in the property information 151 described with reference to FIG. 10 is extracted in the process in S16, the data storage unit 113 identifies a piece of information, a child element name of which is set to a piece of information set as an element name of the piece of information with the piece number of 2 in the property information 151 described with reference to FIG. 10, from the property information 152 described with reference to FIG. 11. The data storage unit 113 identifies va:valueAssertion that is a piece of information set as a parent element name of the identified piece of information (the piece of information with the piece number of 1).

The data storage unit 113 then refers to the storage destination rule 132a described with reference to FIG. 12 and identifies a piece of information, an element name of which is set to va:valueAssertion. The data storage unit 113 identifies ${schemaLocation}/${schema FileName}-rule-${resourceID}.xml that is a piece of information set as a linkbase for the identified piece of information (the piece of information with the piece number of 1). In this case, val and schema1 that are pieces of information set in the schema location for the piece of information with the piece number of 1 in the storage destination rule 132a described with reference to FIG. 12 are substituted for ${schemaLocation} and ${schemaFileName}. In this case, rule1 that is a piece of information set as the ID for the piece of information with the piece number of 1 in the property information 151 described with reference to FIG. 10 is substituted for ${resourceID}.

For this reason, the data storage unit 113 stores the definition element (the definition element extracted in the process in S16) corresponding to the piece of information with the piece number of 2 in the property information 151 described with reference to FIG. 10 in the file with the filename of val/schema1-rule-rule1.xml.

Referring back to FIG. 7, the data storage unit 113 judges whether all of the definition elements are extracted in the process in S16 (S23).

If it is judged as a result that not all of the definition elements are extracted in the process in S16 (NO in S23), the data storage unit 113 performs the processes in S16 and steps subsequent thereto again.

On the other hand, if it is judged that all of the definition elements are extracted in the process in S16 (YES in S23), the information processing apparatus 1 ends the storage control process.

Note that the information processing apparatus 1 executes the storage control process, thereby generating, for example, a file which includes data (1), data (2), data (a), data (3), and data (b) among the pieces of data described with reference to FIG. 9, as illustrated in FIG. 14. The information processing apparatus 1 also generates, for example, a file which includes data (4) and data (c) among the pieces of data described with reference to FIG. 9, as illustrated in FIG. 15. The information processing apparatus 1 further generates, for example, a file which includes data (5) and data (d) among the pieces of data described with reference to FIG. 9, as illustrated in FIG. 16.

As described above, the information processing apparatus 1 according to the present embodiment accepts a file which includes a plurality of definition elements included in the linkbase 142 and a piece of information (a piece of property information) indicating a correspondence between each of the plurality of definition elements and attributes of the definition element.

The information processing apparatus 1 classifies the plurality of definition elements into a plurality of groups in accordance with the plurality of attributes that are each associated with any one of the plurality of definition elements, based on the accepted pieces of information indicating the correspondences. After that, the information processing apparatus 1 generates, for each of the plurality of groups, a file which stores one or more definition elements included in the group and stores the generated file in a storage destination corresponding to attributes of the definition element(s) included in the file.

That is, the information processing apparatus 1 classifies each definition element included in the linkbase 142 by referring to the content of a piece of property information corresponding to the definition element.

The above-described configuration allows the information processing apparatus 1 to automatically classify each definition element included in the linkbase 142. The information processing apparatus 1 is thus capable of reducing the work burden of manual classification of definition elements.

Second Embodiment

Figure 17:
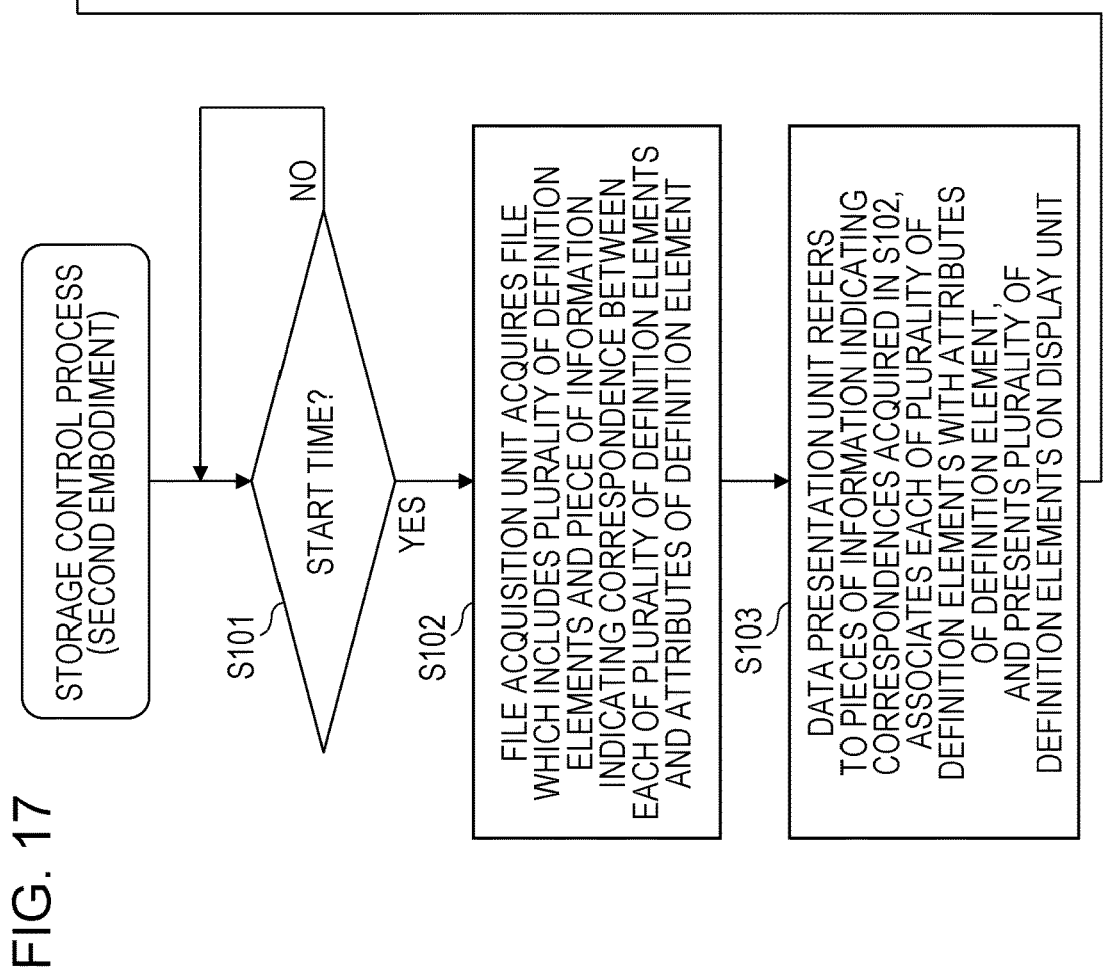
FIG. 17 is a flowchart for explaining a storage control process according to a second embodiment.
Figure 18:
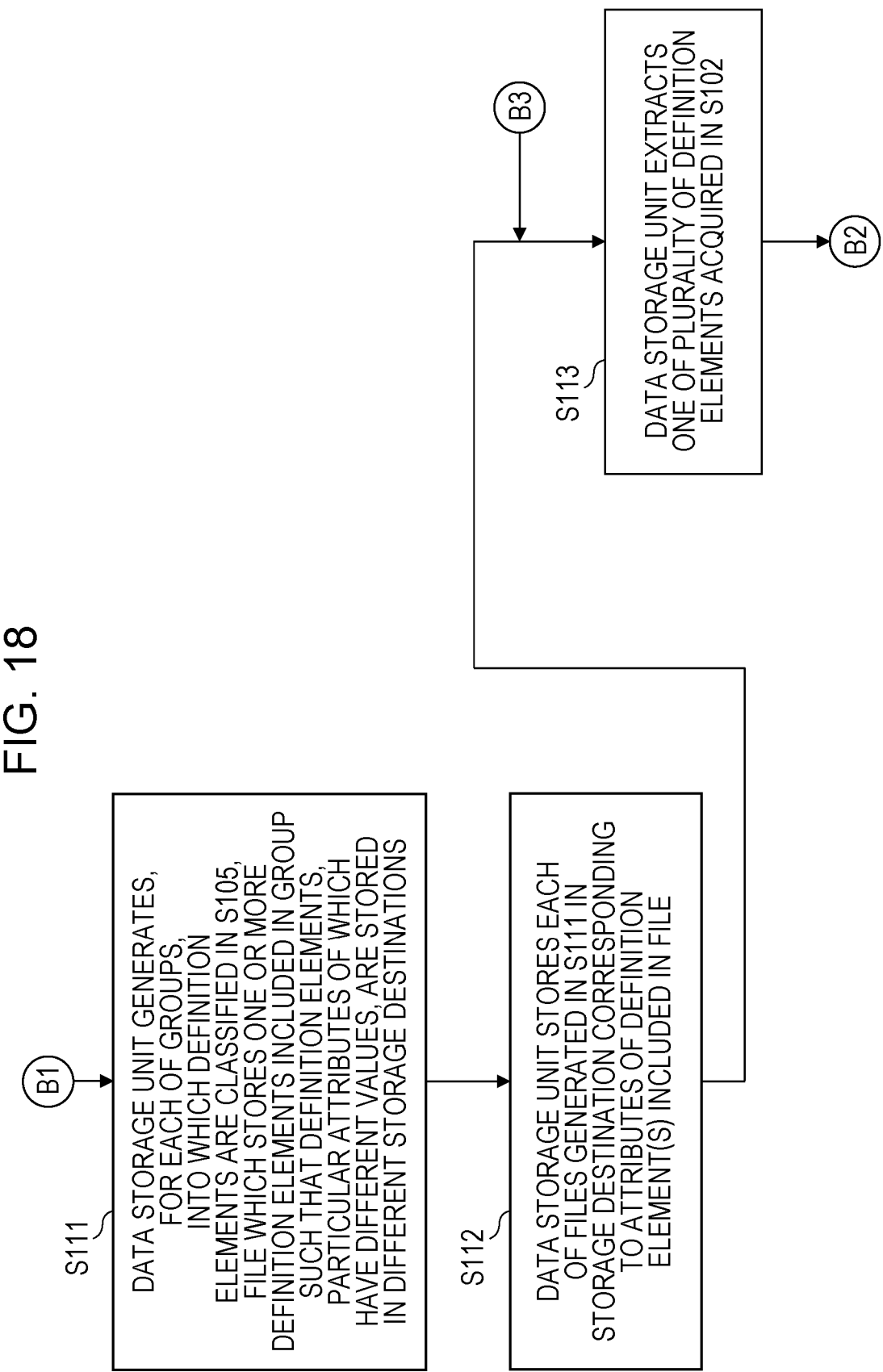
FIG. 18 is a flowchart for explaining the storage control process according to the second embodiment.
Figure 19:
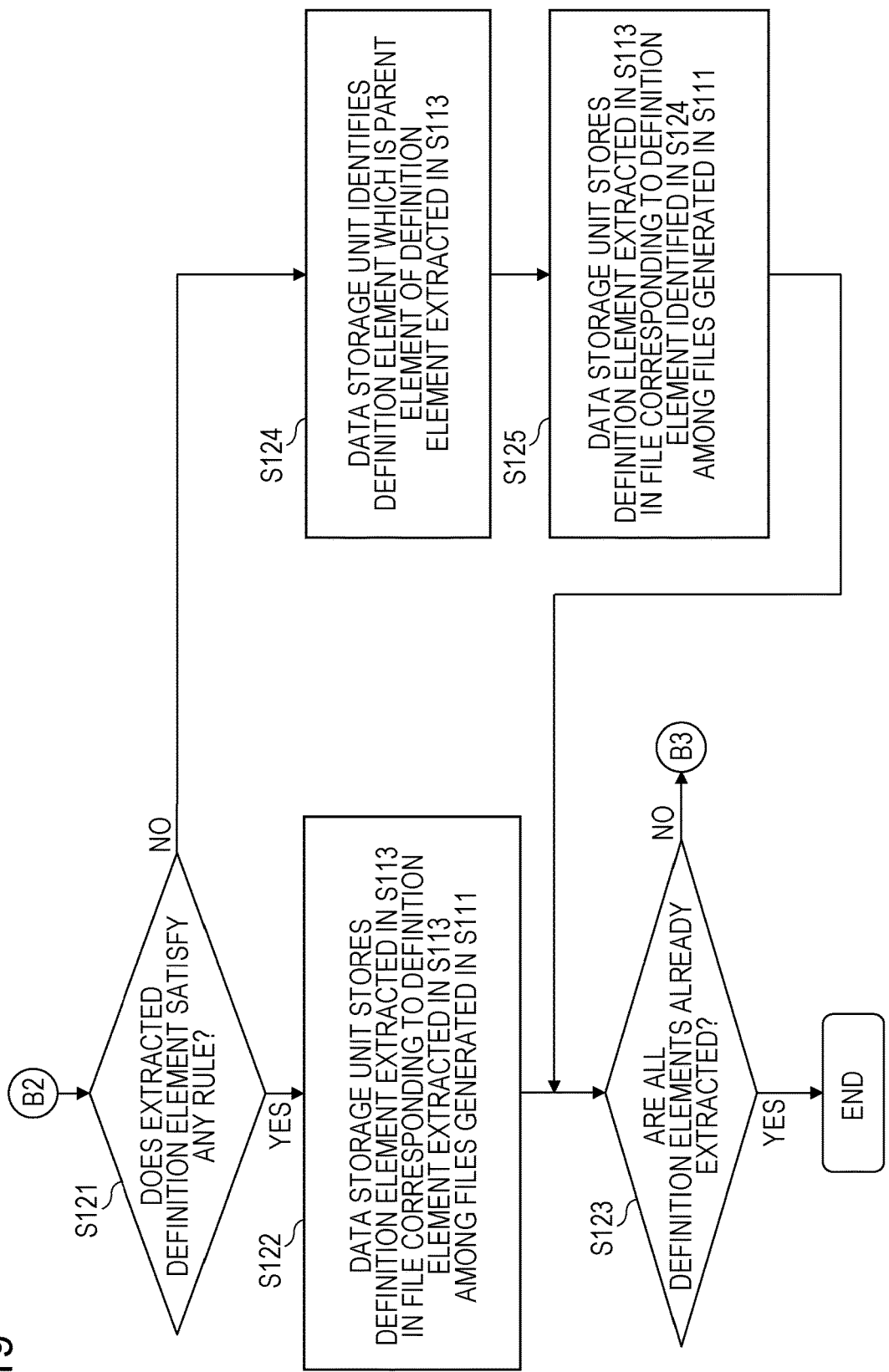
FIG. 19 is a flowchart for explaining the storage control process according to the second embodiment.

A second embodiment will be described. FIGS. 17 to 19 are flowcharts for explaining a storage control process according to the second embodiment. FIGS. 20 and 21 are charts for explaining the storage control process according to the second embodiment. An overview of the storage control process in FIGS. 17 to 19 will be described with reference to FIGS. 20 and 21.

The storage control process according to the second embodiment is a process which is to be performed in a case where property information 151 or property information 152 for each definition element included in a linkbase 142 is desired to be updated before storage of the definition element included in the linkbase 142.

Flowchart for Explaining Details of Second Embodiment

Flowcharts for explaining details of the second embodiment will be described. FIGS. 17 to 19 are flowcharts for explaining the details of the second embodiment.

As illustrated in FIG. 17, a file acquisition unit 111 waits for a start time for the storage control process (NO in S101).

When a start time comes (YES in S101), the file acquisition unit 111 acquires a file which includes a plurality of definition elements included in the linkbase 142 and a piece of information (a piece of property information) indicating a correspondence between each of the plurality of definition elements and attributes of the definition element (S102).

A data presentation unit 114 of an information processing apparatus 1 then refers to the pieces of information (the pieces of property information) indicating the correspondences acquired in the process in S102, associates each of the plurality of definition elements acquired in the process in S102 with the attributes of the definition element acquired in the process in S102, and presents the plurality of definition elements on a display unit (S103). More specifically, the data presentation unit 114 associates pieces of data included in the linkbase 142 described with reference to FIG. 9 with the property information 151 and the property information 152 described with reference to FIGS. 10 and 11 and presents the pieces of data on an operation terminal 3.

After that, an edit acceptance unit 115 of the information processing apparatus 1 waits until an edit instruction to change the correspondences presented in the process in S103 or an instruction not to change the correspondences presented in the process in S103 is accepted (NO in S104). More specifically, the edit acceptance unit 115 waits until a person in charge gives any instruction via the operation terminal 3.

When an edit instruction to change the correspondences presented in the process in S103 or an instruction not to change the correspondences presented in the process in S103 is accepted (YES in S104), a group classification unit 112 refers to the pieces of information (the pieces of property information) indicating the correspondences, an edit to which is accepted in the process in S104, and identifies, for each of rules included in a storage destination rule 132 which is stored in an information storage region 130, one or more definition elements, the piece(s) of information indicating the correspondence(s) after the edit accepted in the process in S104 for which satisfies (satisfy) the rule, among the plurality of definition elements acquired in the process in S102. The group classification unit 112 classifies, for each of the rules included in the storage destination rule 132 stored in the information storage region 130, the plurality of definition elements such that the identified one or more definition elements fall into the same group (S105).

After that, a data storage unit 113 (a file generation unit 113a) generates, for each of groups, into which the definition elements are classified in the process in S105, a file which stores one or more definition elements included in the group such that definition elements, particular attributes of which have different values, are stored in different storage destinations (S111), as illustrated in FIG. 18. The data storage unit 113 (a file storage unit 113b) stores each of the files generated in the process in S111 in a storage destination corresponding to attributes of the definition element(s) included in the file (S112).

The data storage unit 113 then extracts one of the plurality of definition elements acquired in the process in S102 (S113). As illustrated in FIG. 19, the data storage unit 113 judges whether the definition element extracted in S113 is a definition element which satisfies any of the rules included in the storage destination rule 132 (S121).

If it is judged as a result that the definition element extracted in S113 is a definition element which satisfies any one of the rules included in the storage destination rule 132 (YES in S121), the data storage unit 113 stores the definition element extracted in the process in S113 in a file corresponding to the definition element extracted in the process in S113 among the files generated in the process in S111 (S122).

On the other hand, if it is judged that the definition element extracted in S113 is a definition element which satisfies none of the rules included in the storage destination rule 132 (NO in S121), the data storage unit 113 identifies a definition element which is a parent element of the definition element extracted in the process in S113 (S124).

The data storage unit 113 stores the definition element extracted in the process in S113 in a file corresponding to the definition element identified in the process in S124 among the files generated in the process in S111 (S125).

After that, the data storage unit 113 judges whether all of the definition elements are extracted in the process in S113 (S123).

If it is judged as a result that not all of the definition elements are extracted in the process in S113 (NO in S123), the data storage unit 113 performs the processes in S113 and steps subsequent thereto again. On the other hand, if it is judged that all of the definition elements are extracted in the process in S113 (YES in S123), the information processing apparatus 1 ends the storage control process.

Specific Example (1) of Storage Control Process According to Second Embodiment

A specific example of the storage control process according to the second embodiment will be described.

The data presentation unit 114, for example, presents the pieces of data described with reference to FIG. 9 and the property information 151 and the property information 152 described with reference to FIGS. 10 and 11 on a display device of the operation terminal 3 (S103).

If an edit which updates a piece of information set as a language of a piece of information with a piece number of 5 in the property information 151 described with reference to FIG. 10 with ja is made, as indicated by an underlined portion in FIG. 20, the group classification unit 112 performs, for example, generation of a group which includes data (5) alone among the pieces of data described with reference to FIG. 9 (YES in S104 and S105).

After that, the data storage unit 113, for example, generates a file with a filename of val/schema1-rule-rule1-lab-ja.xml for the group including data (5) alone (S111). The data storage unit 113 then stores data (5) and data (d) among the pieces of data described with reference to FIG. 9 in the file with the filename of val/schema1-rule-rule1-lab-ja.xml (S122).

Specific Example (2) of Storage Control Process According to Second Embodiment

Another specific example of the storage control process according to the second embodiment will be described.

The data presentation unit 114, for example, presents the pieces of data described with reference to FIG. 9 and the property information 151 and the property information 152 described with reference to FIGS. 10 and 11 on the display device of the operation terminal 3 (S103).

If an edit which updates a piece of information set as an ID of a piece of information with a piece number of 1 in the property information 151 described with reference to FIG. 10 with rule2 is made, as indicated by an underlined portion in FIG. 21, the group classification unit 112 performs, for example, generation of a group which includes data (1) alone among the pieces of data described with reference to FIG. 9 (YES in S104 and S105).

After that, the data storage unit 113, for example, generates a file with a filename of val/schema1-rule-rule2.xml for the group including data (1) alone (S111). The data storage unit 113 stores data (1), data (2), data (a), data (3), and data (b) among the pieces of data described with reference to FIG. 9 in the file with the filename of val/schema1-rule-rule2.xml (S122 and S125).

With the above-described configuration, even if the property information 151 or the property information 152 for each definition element included in the linkbase 142 is desired to be updated before storage of the definition element included in the linkbase 142, the information processing apparatus 1 is capable of performing the storage control process while performing the updating.

Note that the data presentation unit 114 may, for example, present a data model for the linkbase 142 on the display device of the operation terminal 3 in the process in S103. More specifically, the data presentation unit 114 may, for example, present a data model described with reference to FIG. 8 and accept a change to the presented data model. If a change is made to the presented data model, the edit acceptance unit 115 may change the property information 151 and the property information 152 described with reference to FIGS. 10 and 11 such that the property information 151 and the property information 152 correspond to the data model after the change.

The above-described configuration allows the information processing apparatus 1 to cause the person in charge to easily change the property information 151 or the property information 152. The information processing apparatus 1 is thus capable of reducing the burden on the person in charge associated with change of the property information 151 or the property information 152.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a storage control program which causes a computer to execute a process comprising:
    accepting a file including a linkbase that includes a plurality of first pieces of text data and a piece of information indicating a correspondence between each of the plurality of first pieces of text data and a plurality of attributes of the plurality of first pieces of text data, the correspondence further indicating a relationship between the leach of the plurality of first pieces of text data and one or more second pieces of text data in the accepted file;
    classifying the plurality of first pieces of text data into a plurality of groups in accordance with at least one attribute that is associated with any one of the plurality of first pieces of text data based on the piece of information indicating the correspondence included in the accepted file;
    generating, for each of the plurality of groups, a file that stores one or a plurality of pieces of text data included in the group; and
    storing the generated file in a storage destination corresponding to the at least one attribute associated with the first pieces of text data in the generated file,
    wherein
    the classifying includes referring to the piece of information indicating the correspondence, identifying, for each of a plurality of rules defined in advance, one or a plurality of pieces of text data, the piece of information indicating the correspondence for which satisfies the rule, among the plurality of first pieces of text data, and classifying the plurality of pieces of text data such that the identified one or plurality of pieces of text data fall into a same one of the plurality of groups, and
    for one or more of first pieces of text data the correspondence for which does not satisfy the rule, identifying a second piece of text data indicated by the correspondence among the one or more second pieces of text data, and storing the one or more first pieces of text data in a file in which the second piece of text data is stored.

2. The storage medium according to claim 1, wherein the generating includes generating, for each of the plurality of groups, the file that stores the one or plurality of pieces of text data included in the group such that the plurality of pieces of text data and the plurality of attributes of which have different values, are stored in different files of a plurality of files.

3. A non-transitory computer-readable storage medium storing a storage control program which causes a computer to execute a process comprising:
    accepting a file including a linkbase that includes a plurality of first pieces of text data and a piece of information indicating a correspondence between each of the plurality of first pieces of text data and a plurality of attributes of the plurality of first pieces of text data, the correspondence further indicating a relationship between the each of the plurality of first pieces of text data and one or more second pieces of text data in the accepted file;
    associating each of the plurality of first pieces of text data included in the accepted file with the attributes of the plurality of first pieces of text data, based on the piece of information indicating the correspondence included in the file, and presenting the plurality of first pieces of text data on a display unit;
    classifying the presented plurality of first pieces of text data into a plurality of groups in accordance with at least one attribute that is associated with any one of the plurality of first pieces of text data based on the piece of information indicating the correspondence after an edit that changes the correspondence between any one of the presented plurality of first pieces of text data and the at least one attribute based on the edit being accepted;
    generating, for each of the plurality of groups, a file that stores one or a plurality of pieces of text data included in the group; and
    storing the generated file in a storage destination corresponding to the at least one attribute associated with the first pieces of text data in the generated file,
    wherein
    the classifying includes referring to the piece of information indicating the correspondence, identifying, for each of a plurality of rules defined in advance, one or a plurality of pieces of text data, the piece of information indicating the correspondence for which satisfies the rule, among the plurality of first pieces of text data, and classifying the plurality of pieces of text data such that the identified one or plurality of pieces of text data fall into a same one of the plurality of groups, and for one or more of first pieces of text data the correspondence for which does not satisfy the rule, identifying a second piece of text data indicated by the correspondence among the one or more second pieces of text data, and storing the one or more of first pieces of text data in a file in which the second piece of text data is stored.

4. A storage control apparatus comprising;
a memory stores instructions, and
a processor coupled to the memory and the instructions are executed by the processor to perform a process comprising:

accepting a file including a linkbase that includes a plurality of first pieces of text data and a piece of information indicating a correspondence between each of the plurality of first pieces of text data and a plurality of attributes of the plurality of first pieces of text data, the correspondence further indicating a relationship between the each of the plurality of first pieces of text data and one or more second pieces of text data in the accepted file;

classifying the plurality of first pieces of text data into a plurality of groups in accordance with at least one attribute that is associated with any one of the plurality of first pieces of text data based on the piece of information indicating the correspondence included in the accepted file;

generating, for each of the plurality of groups, a file that stores one or a plurality of pieces of text data included in the group; and storing the generated file in a storage destination corresponding to the at least one attribute associated with the first pieces of text data in the generated file, wherein the classifying includes referring to the piece of information indicating the correspondence, identifying, for each of a plurality of rules defined in advance, one or a plurality of pieces of text data, the piece of information indicating the correspondence for which satisfies the rule, among the plurality of first pieces of text data, and classifying the plurality of pieces of text data such that the identified one or plurality of pieces of text data fall into a same one of the plurality of groups, and for one or more of first pieces of text data the correspondence for which does not satisfy the rule, identifying a second piece of text data indicated by the correspondence among the one or more second pieces of text data, and storing the one or more of first pieces of text data in a file in which the second piece of text data is stored.

5. The storage control apparatus according to claim 4, wherein the generating includes generating, for each of the plurality of groups, the file that stores the one or plurality of pieces of text data included in the group such that ones of the plurality of pieces of text data, particular ones of the plurality of attributes of which have different values, are stored in different ones of the plurality of files.

6. A storage control method, performed in a computer, comprising:

accepting, with a processor, a file including a linkbase that includes a plurality of first pieces of text data and a piece of information indicating a correspondence between each of the plurality of first pieces of text data and a plurality of attributes of the plurality of first pieces of text data, the correspondence further indicating a relationship between the each of the plurality of first pieces of text data and one or more second pieces of text data in the accepted file;

classifying, with the processor, the plurality of first pieces of text data into a plurality of groups in accordance with at least one attribute that is associated with any one of the plurality of first pieces of text data based on the piece of information indicating the correspondence included in the accepted file;

generating with the processor, for each of the plurality of groups, a file that stores one or a plurality of pieces of text data included in the group; and storing the generated file in a storage destination corresponding to the at least one attribute associated with the first pieces of text data in the generated file, wherein the classifying includes referring to the piece of information indicating the correspondence, identifying, for each of a plurality of rules defined in advance, one or a plurality of pieces of text data, the piece of information indicating the correspondence for which satisfies the rule, among the plurality of first pieces of text data, and classifying the plurality of pieces of text data such that the identified one or plurality of pieces of text data fall into a same one of the plurality of groups, and for one or more of first pieces of text data the correspondence for which does not satisfy the rule, identifying a second piece of text data indicated by the correspondence among the one or more second pieces of text data, and storing the one or more of first pieces of text data in a file in which the second piece of text data is stored.

* * * * *